United States Patent [19]
Licciardi et al.

[11] Patent Number: 5,946,314
[45] Date of Patent: Aug. 31, 1999

[54] METHOD OF EXPANDING THE CAPACITY OF SWITCHING ELEMENTS, AND SWITCHING STAGE OBTAINED BY THE METHOD

[75] Inventors: Luigi Licciardi, Vercelli; Luciano Pilati, Turin; Maura Turolla, Almese, all of Italy

[73] Assignee: CSELT - Centro Studi E Laboratori Telecommunicazioni S.P.A., Turin, Italy

[21] Appl. No.: 08/729,006

[22] Filed: Oct. 10, 1996

[30] Foreign Application Priority Data

Nov. 29, 1995 [IT] Italy .................................. TO95A0957

[51] Int. Cl.⁶ ........................................................ H04J 3/24
[52] U.S. Cl. ............................ 370/398; 370/355; 370/395
[58] Field of Search ..................................... 370/355, 366, 370/389, 390, 392, 395, 397, 398, 411, 427

[56] References Cited

U.S. PATENT DOCUMENTS

| | | | |
|---|---|---|---|
| 5,043,980 | 8/1991 | Day, Jr. et al. | 370/422 |
| 5,179,552 | 1/1993 | Chao | 370/427 |
| 5,369,400 | 11/1994 | Bowdon | 370/366 |
| 5,742,761 | 4/1998 | Olnowich et al. | 370/355 |

FOREIGN PATENT DOCUMENTS

| | | |
|---|---|---|
| 0 446 493 A1 | 3/1990 | European Pat. Off. . |
| WO 86/03355 | 11/1985 | WIPO . |
| WO 93/06676 | 9/1992 | WIPO . |

OTHER PUBLICATIONS

"A Low Power ATM Switching Element for Broadband Applications"; International Telecommunication Symposium 1994; C.Claretto et al.; 5 pages.
Japanese Patent Laid–Open Application 170745 (1990).
Japanese Patent Laid–Open Application 216934 (1990).

Primary Examiner—Douglas W. Olms
Assistant Examiner—Shick Hom
Attorney, Agent, or Firm—Herbert Dubno

[57] ABSTRACT

The capacity of switching elements, for instance 8×8 elements, is expanded, to originate single-stage elements with greater capacity (16×16 or 32×32), by arranging an even plurality of such elements in an output substage and by placing upstream of the output substage at least a first input substage comprising a corresponding even plurality of the switching elements. The even and, respectively, the odd outputs of the elements of the input substage are connected in an orderly manner to the inputs of the switching elements of the output substage. A routing management logic to obtain single-stage elements is also provided within each individual switching element.

34 Claims, 5 Drawing Sheets

METHOD OF EXPANDING THE CAPACITY OF SWITCHING ELEMENTS, AND SWITCHING STAGE OBTAINED BY THE METHOD

FIELD OF THE INVENTION

The present invention relates in general to switching networks of telecommunications systems and in particular it deals with the problem of expanding the capacity of switching elements included in such switching networks.

BACKGROUND OF THE INVENTION

In switching networks, specifically in ATM (Asynchronous Transfer Mode) switching networks, multiple switching elements are suitably connected to obtain networks with high switching capacity. Each element of the network constitutes a stage. Stages are preferably in odd number (3, 5, less frequently 7). Increasing the number of stages increases switching capacity but also network complexity.

Given the functional complexity required of each individual element and the high speed with which ATM streams have to be handled (typically 155 Mbit/s, 311 Mbit/s, 622 Mbit/s), from the construction point of view a compromise is sought between the switching capacity of the individual element and the required circuit complexity. According to the most common solutions available at present, the switching elements are 8×8 and 16×16 elements, i.e. each element switches 8/16 input streams onto an equal number of output streams. Those solutions represent an excellent compromise between complexity and switching capacity, taking also into account that, the more complex the elements are, the more difficult it is to ensure fully reliable operation and the lower are the yields when the related integrated circuits are manufactured.

The paper entitled "An ATM Switch Hardware Technologies Using Multichip Packaging" by Y. Doi et al., IEEE Transactions on Components, Hybrids and Manufacturing Technology, Vol. 16, No. 1, February 1993, pp. 60 and fol., describes an ATM switching system in which multiple 4×4 elements, with shared buffer (i.e. with a service memory on the component shared by the various streams), are connected on a single substrate, to produce a 16×16 switching module. That type of connection solely aims to solve the problem of size due to the presence of multiple stages, and the final module is not managed as an individual stage. This clearly limits the overall capacity of a switching network using the modules, since the number of stages cannot be increased at will.

PURPOSES AND SUMMARY OF THE INVENTION

The main purpose of the present invention is to use an element with given switching capacity, for instance 8×8 or 16×16 (which, as said, is an excellent compromise between complexity and switching capacity), to make structures with higher switching capacities (e.g. 16×16, 32×32, etc.) in a typical single-stage configuration. The proposed solution, having the characteristics stated in the claims that follow, is well suited for the production of components with high switching capacity using multichip module techniques, by connecting on a single substrate well-tried components having a simpler operation.

Although, as is well known, there are various types of ATM cell management, the invention is particularly suited to the use of shared buffer elements; this solution eliminates the need to have access to memories external to the component.

BRIEF DESCRIPTION OF THE DRAWING

The invention shall now be described, purely by way of non-limiting example, with reference to the annexed drawing, wherein.

DETAILED DESCRIPTION OF THE INVENTION

In the following description, it will be assumed that the base element of which the switching capacity is to be expanded is the 8×8 switching element described in Italian patent application TO93A00057 filed on Dec. 16, 1993 and open to public inspection since Jun. 16, 1995. The same element is also described in the paper "A low power ATM Switching Element for Broadband Applications", by S. Claretto et al., presented at the International Telecommunication Symposium 1994, Rio de Janeiro, Aug. 22–26, 1994. The patent application and the paper mentioned above contain additional background information on the typical context of application of the invention.

As is well known, in an ATM digital telecommunications network, cells (i. e. packets of a set number of bytes) are transmitted which are routed on the basis of information contained in appropriate fields of the cell, in particular in the header. For example, the solution illustrated in the aforementioned documents uses 64-byte cells: bytes 1 through 15 form the header and specifically, the head bytes 1 through 7 define the so-called routing tags (see FIG. 1 of the patent application and FIG. 2 of the paper). In the cell format described there by way of example, one byte is dedicated to the tag related to each stage (thus, at most 7 stages are considered). Of the eight bits in each byte, the system uses, in the order: the five most significant bits (hereinafter indicated as a4–a0) for switching information (maximum $2^5=32$ output links), two bits (hereinafter indicated as r1 and r2) for the routing mode (virtual routing, random distribution, distribution with link exclusion) or a command of cell extraction towards a control micro-processor for diagnostic purposes, and one bit, the least significant one, for parity check.

In respect of the routing mode, we recall that: virtual routing means that the output link on which the cell is to be sent is explicitly indicated; random distribution means that the cell is routed onto a link randomly; distribution with link exclusion is like the random distribution, but excluding a specified link.

Note that an 8×8 ($2^3$ inputs/outputs) switching stage exploits only three bits (usually the lowest-rank bits a0, a1 and a2) of the switching information in each tag.

When connecting several 8×8 elements to make single-stage structures of greater capacity, e.g. 16×16 or 32×32 structures, two requirements must be complied with: avoiding blocking situations and using a single tag for each stage.

Two solutions capable of complying with such requirements shall now be described. The solutions described shall be analysed from the point of view of both the connection architecture and the logic which the base component (e.g. 8×8) must have in order to allow its use in the expanded stage. It should further be noted that, although hereinafter reference will be made, as an example of maximum expansion, to a 32×32 structure (since five switching information bits are available in the tag of the example), the principles of the invention in general can be extended to more complex single-stage structures (e.g. 64×64 or more), with a different tag arrangement.

Figure 1:
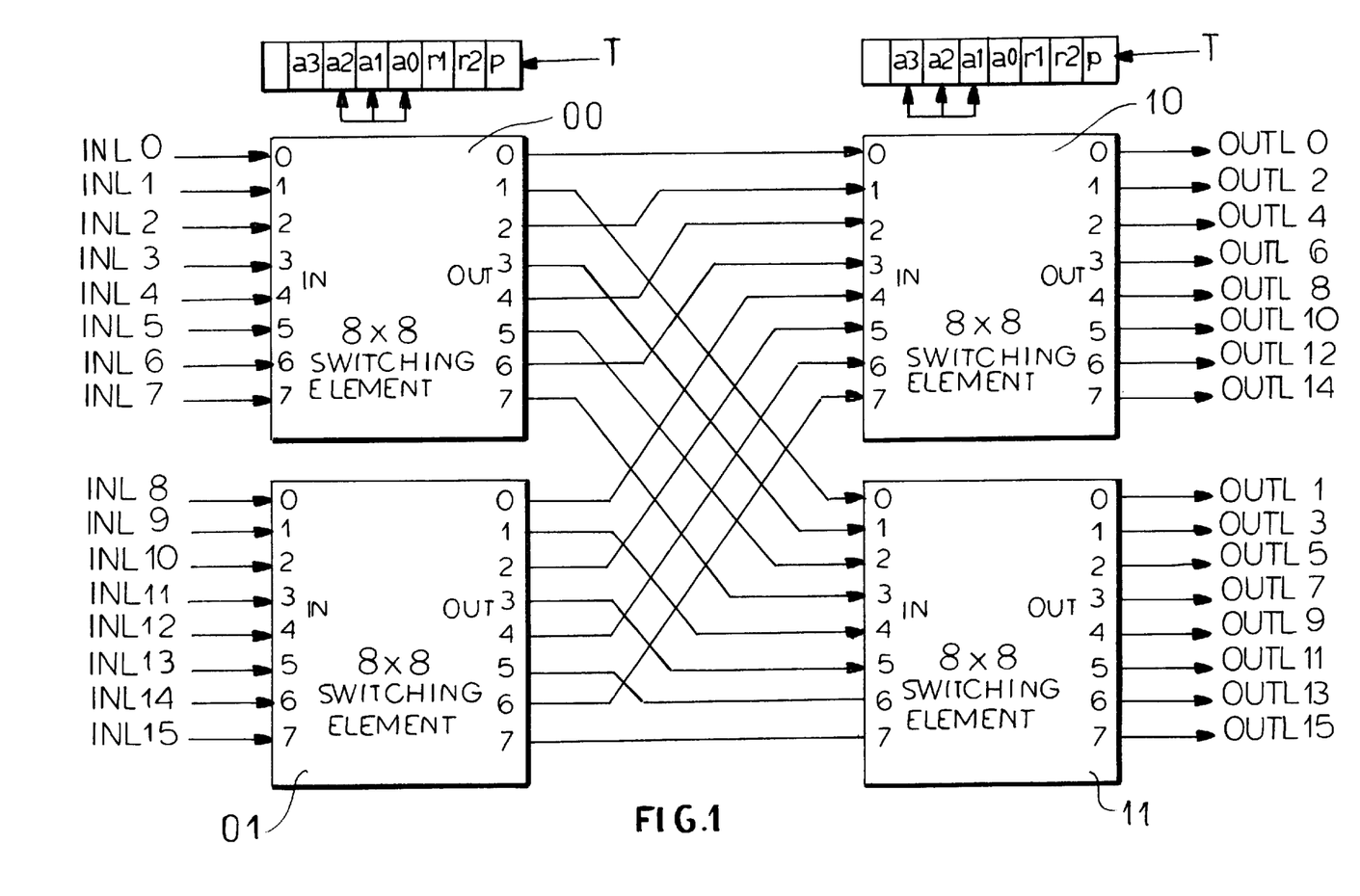
FIG. 1 is a schematic representation of the manner in which, according to the invention, the switching capacity of an 8×8 element is expanded to make a 16×16 switching stage.
Figure 2:
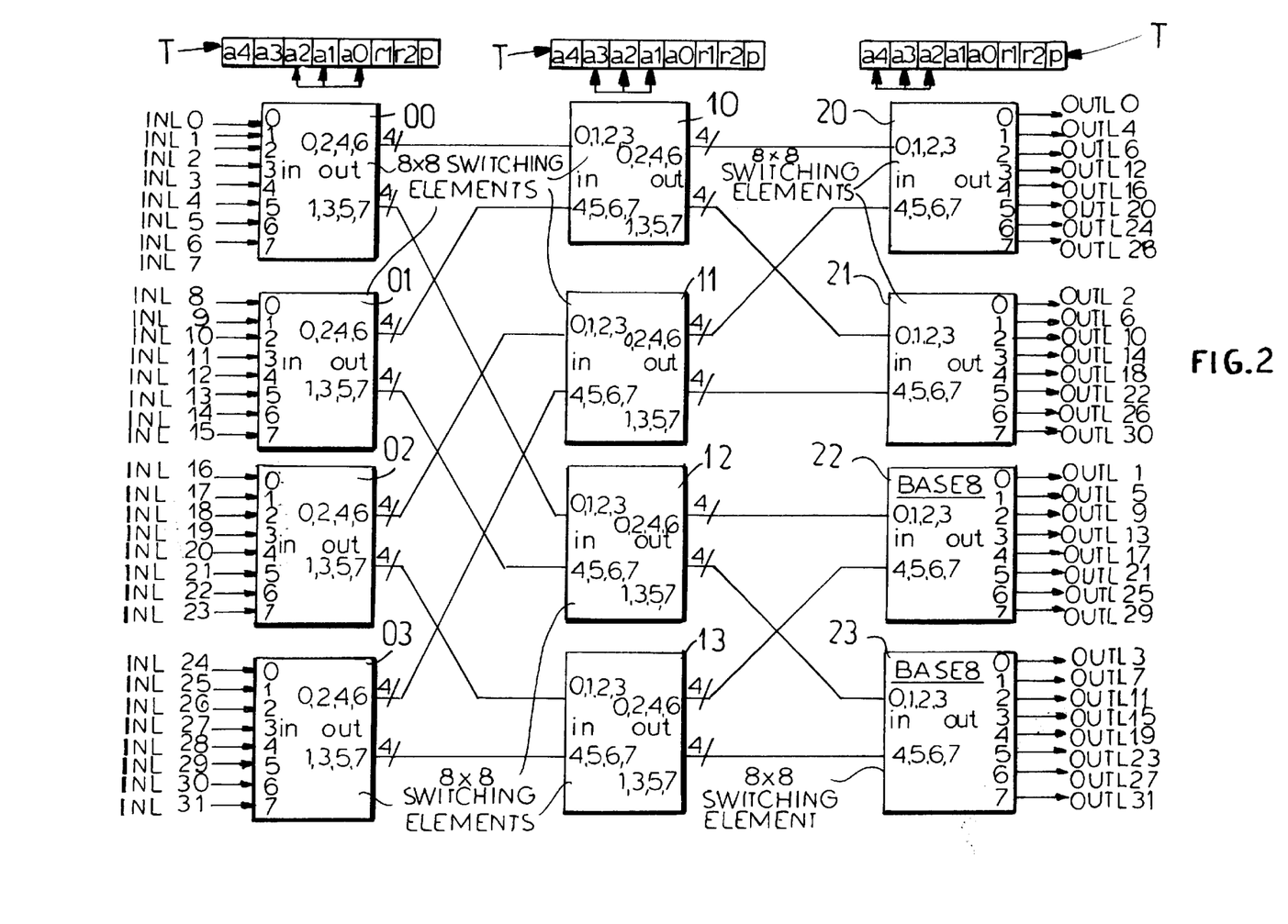
FIG. 2 is a schematic representation of the extension of the invention to the construction of a 32×32 switching stage starting from 8×8 elements.

For the sake of simplicity, the examples illustrated hereinafter refer to the use, as base element, of an 8×8 element used to make a 16×16 stage (FIG. 1) and a 32×32 stage (FIG. 2). However, it should be noted that four 16×16 base elements could be connected according to the scheme shown in FIG. 2 to make a 32×32 stage. Also, although hereinafter reference shall be made to stages made of base elements all identical to each other (for instance, all 8×8 elements), it is wholly evident that the invention can also use hybrid schemes, comprising different base elements, for example both 8×8 and 16×16 elements.

Stage Architecture

Hereinafter the term "stage" shall be used to indicate a set of the co-operating elements which is ideally seen as organised according to a matrix structure; the term "sub-stage" shall therefore be used to indicate each column of base elements.

16×16 architecture

The single-stage 16×16 ATM switching structure depicted in FIG. 1 is organized as a 2×2 matrix in which both sub-stage 0 (input sub-stage) and sub-stage 1 (output sub-stage) comprise a pair of 8×8 switching elements, namely elements 00, 01 and elements 10, 11, respectively.

The sixteen input links (INL0 . . . INL15) are connected to the two groups of eight inputs available on the switching elements of sub-stage 0. More specifically links INL0 to INL7 are orderly connected to inputs 0 through 7 of element 00 while the remaining links, INL8 through INL15, are orderly connected to inputs 0 through 7 of element 01.

The eight outputs of these elements are orderly connected to the two groups of eight inputs of sub-stage 1 of the matrix. In particular, the even outputs of element 00 are connected to the first four inputs of switching element 10, while the even outputs of element 01 are connected to the other four inputs of that element; the odd outputs of the switching elements of sub-stage 0 are similarly connected to the inputs of switching element 11.

The outputs of elements 10 and 11 form the sixteen output links (OUTL0 . . . OUTL15) of the 16×16 switching architecture. The eight outputs of element 10 form the output links with even addresses, while the outputs of element 11 form the output links with odd addresses.

To sunmmarise, elements 00, 01 of the input sub-stage and elements 10, 11 of the output sub-stage are connected according to a crossed scheme, in which the even and odd outputs of switching elements 00, 0 1 of the input sub-stage, located upstream, are orderly connected (i.e. first all the outputs of one type—the even ones, in the example shown—then all the outputs of the other type—the odd ones, in the example shown) to the inputs of the switching elements of output sub-stage 10, 11 located downstream.

For the sake of clarity, It should be underlined yet again, that the term "orderly", as used in the enclosed claims, is totally independent of the fact that even outputs precede odd ones, since the order can be inverted.

The address of the output link for a 16×16 switching matrix is arranged into a four bit information field (bits a3, a2, a1, a0) belonging to tag byte T. The routing mode required for a cell (virtual routing, random distribution, distribution with link exclusion) is sequentially performed by the switching elements of sub-stages 0 and 1. In particular, a switching element of sub-stage 0 routes the cell by taking into consideration bits a2, a1, a0 of the address contained in the respective tag byte, while a switching element of sub-stage 1 routes according to bits a3, a2, a1 of the same address. For example, a cell present on any one of the sixteen input links and to be routed by virtual switching on output link 13 (a3=1, a2=1, a1=0, a0=1), is routed by the element of sub-stage 0 towards its output 5 (a2=1, a1=0, a0=1) connected to element 11 of sub-stage 1. Switching element 11 routes the cell towards its output 6 (a3=1, a2=1, a1=0) which in the 16×16 matrix corresponds to output link OUTL13.

It will therefore be appreciated that all switching elements operate on a single tag byte and this characterizes the elements in question as forming a single stage.

32×32 architecture

The single-stage ATM switching structure with 32×32 capacity depicted in FIG. 2 is arranged in a 4×3 matrix in which all elements are again 8×8 switching elements; the matrix therefore has 3 sub-stages (0, 1, 2) each comprising, in this case, multiple pairs (i.e. 4=2n, with n=2) of 8×8 base components.

The thirty-two input links (INL0 . . . INL31) are connected to the four groups of eight inputs available on the switching elements of sub-stage 0 (identified, in the claims that follow, as "second input sub-stage") and more specifically: links INL0 through INL7 are orderly connected to inputs 0 through 7 of element 00; links INL8 through INL15 are orderly connected to inputs 0 through 7 of element 01; similarly, links INL16 through INL23 are connected to element 02; and lastly links INL24 through INL31 to the inputs of switching element 03.

The eight outputs of each element of sub-stage 0 are orderly connected to the four groups of eight inputs of sub-stage 1 (first input sub-stage) of the matrix. In particular, the even outputs of element 00 are connected to the first four inputs of switching element 10 and the even outputs of element 01 are connected to the next four inputs, while the even outputs of switching elements 02 and 03 are connected in the same way to the inputs of switching element 11; the odd outputs of the switching elements of sub-stage 0 are connected to the inputs of elements 12 and 13 in similar fashion.

The outputs of elements 10 and 11 of sub-stage 1 are connected to the inputs of elements 20 and 21 of sub-stage 2 (output sub-stage) and in particular, the even outputs of element 10 are connected to the first four inputs of switching element 20 and the even outputs of element 11 are connected to the other four inputs, while the odd outputs of switching elements 10 and 11 are connected to the inputs of switching element 21 in the same way. The same connection topology is maintained between the outputs of elements 12 and 13 connected to the inputs of elements 22 and 23.

The outputs of the four elements of sub-stage 2 form the thirty-two output links (OUTL0 . . . OUTL31) of the 32×32 switching architecture. The thirty-two links are divided into four groups of eight links and each group is connected to the eight outputs of a switching element of sub-stage 2. The first group comprises the output links with addresses 0, 4, 8, 12, 16, 20, 24, 28, which are respectively connected to outputs 0 through 7 of switching element 20; the links of the second group (links 2, 6, 10, 14, 18, 22, 26, 30) are orderly connected to the eight outputs of element 21; links 1, 5, 9, 13, 17, 21, 25, 29 are connected in a manner similar to the previous ones to the eight outputs of switching element 22 and lastly the links whose address is 3, 7, 11, 15, 19, 23, 27, 31 are connected to the outputs of switching element 23.

From the above description, and from the comparison between FIGS. 1 and 2, it can be deduced that, in regard to sub-stages 1 and 2, the 32×32 architecture of FIG. 2 constitutes the duplication of the 16×16 architecture of FIG. 1, the elements of sub-stage 1 (first input stage) and of sub-stage 2 (output sub-stage) being connected in pairs in a crossed scheme. In particular element pair 10, 11 is connected to element pair 20, 21, while element pair 12, 13 is connected to element pair 22, 23. Here too, within each group of pairs connected to each other, even and odd outputs of the switching elements of sub-stage 1 located upstream are orderly connected (in the example, first all even outputs, then all odd outputs—but it could be vice versa) to the inputs of the switching elements of sub-stage 2, located downstream.

For sub-stages 0 and 1 too, the connection scheme is structurally identical, elements 00, 01 of sub-stage 0 forming an element pair whose outputs are connected in the manner described (first all even outputs, then all odd outputs—or vice versa) to the inputs of elements 10 and 12 forming the second pair.

The same criteria govern the connection of the elements of pair 02, 03 with the elements of pair 11, 13.

To ensure that an actual routing action (distinct output links, no matter what routing mode is adopted: virtual, random distribution, etc . . . ) corresponds to the switching information, it is necessary that in each sub-stage, when defining the pairs of elements destined to be connected to a respective pair of elements in an upstream sub-stage, the pairs of elements that already form a pair for the connection with the elements of the downstream sub-stage and/or that are connected with the same switching element in one of the downstream sub-stages, are not considered.

Thus, for instance, in the 32×32 scheme shown in FIG. 2, elements 00, 01 could be connected, instead of to elements 10, 12, to elements 10, 13, with element 13 exchanging its role with element 12 (also for the connection with elements 02 and 03). Exchanging element 12 with element 11, on the other hand, would not be possible, since the latter is already paired with element 10 for the connection in sub-stage 2, both elements 10 and 11 being connected to element 20 as well as to element 21.

This concept can be summarized by stating that, for the purposes of the connection to the outputs of the switching elements of the upstream sub-stages (for instance, sub-stage 0 in FIG. 3), the pairs formed by switching elements for which a pairing relationship (direct or indirect) exists for the purposes of the connection with the switching elements of downstream sub-stages (sub-stage 2 in FIG. 1 in the example illustrated) are excluded in a sub-stage (in the example, in sub-stage 1).

As stated previously, the invention can also be made as a hybrid scheme, in which the various base elements are not all of the same type, e.g. 8×8. Thus, in the scheme shown in FIG. 2, each of the two blocks of four 8×8 elements comprising elements 10, 11, 20, 21 and elements 12, 13, 22, 23 respectively, could be replaced by a 16×16 element. The choice of connecting the even and odd order outputs of input sub-stage 0—orderly, i.e. first the even and then the odd ones, or vice versa—to the inputs of the elements of the downstream sub-stage will be maintained unaltered.

Going back to the scheme shown in FIG. 2, it can be noted that the address of the output link for a 32×32 switching matrix is arranged in an information field of five bits (a4, a3, a2, a1, a0) belonging to tag byte T present in the routing part of the ATM cell. The cell routing function is performed sequentially by the switching elements of sub-stages 0, 1 and 2. In particular the switching element of sub-stage 0 routes the cell by considering bits a2, a1, a0 of the address contained in the respective tag byte T, the switching element of sub-stage 1 routes according to bits a3, a2, a1 of the same address, while the element of sub-stage 2 analyses the most significant bits of the information field (a4, a3, a2). In other words, each sub-stage uses a group of bits of the string expressing the switching information, which group differs by one bit with respect to the one used by an adjacent sub-stage, starting from the least significant bits (sub-stage 0) and going on to the most significant bits (sub-stage 2).

Referring to the example above, the cell to be routed by virtual routing on output link 13 (a4=0, a3=1, a2=1, a1=0, a0=1), present on any one of the 32 input links, is routed by the element in sub-stage 0 towards its output 5 (a2=1, a1=0, a0=1) connected with element 12 or 13 of sub-stage 1. The switching element in sub-stage 1 routes the cell towards its output 6 (a3=1, a2=1, a1=0) connected to element 2 in sub-stage 2. The latter element interprets the most significant bits of the tag and routes the cell towards its output 3 (a4=0, a3=1, a2=1) to which output link 13 (OUTL13) is connected.

For each base element, the configuration (16×16, 32×32) of the matrix and the position of the sub-stage (and thus the procedures of interpretation of tag T) are programmed by the control microprocessor during an initialization phase.

Routing

For a given configuration of the base architecture and for a given routing mode indicated by bits r1, r2 in the tag, a switching stage according to the invention can operate according to different types of routing. In the first type all sub-stages operate in the same mode (virtual, random distribution, distribution with link exclusion or, possibly, extraction towards the microprocessor), as indicated by bits r1, r2; in the second one only the last sub-stage performs the routing as indicated in the tag while the previous sub-stages operate according to a particular distribution scheme, hereinafter referred to as "even/odd distribution". For the sake of simplicity, the first solution shall be referred to as "homogeneous routing", the second one as "mixed routing".

Homogeneous routing

Routing fields are interpreted by each sub-stage in the same way, as far as the routing mode is concerned, but with a 1-bit shift for output link determination, as disclosed in the description of the 16×16 and 32×32 architectures.

Mixed routing

By examining the interconnection schemes in FIGS. 1 and 2, one can observe that between sub-stages 0 and 1 of the matrices examined and between sub-stages 1 and 2 of the 32×32 matrix there are always four links, of even or odd addresses, connecting the outputs of a switching element with the inputs of an element of the next sub-stage. The "mixed routing" performs, for the switching elements belonging to sub-stage 0 in the 16×16 matrix and to sub-stages 0 and 1 in the 32×32 matrix, a sequential distribution of cells between the even or the odd outputs, depending on the least significant bit of the group of bits examined in the switching information field. More particularly, a bit "0"

causes distribution on the even links and a bit "1" distribution on the odd links. For the switching elements in the last matrix sub-stage, the routing procedure is always determined by the 3 most significant bits of the address.

Switching matrices in which mixed routing is performed offer advantages in terms of traffic performance with respect to matrices using homogeneous routing. Distributing the cells among four outputs allows optimizing the resources present in the base element, such as the shared output memory, and avoiding cell loss situations which could occur if multiple cells have the 3-bit address field, considered by the elements of the input sub-stages, with equal content.

With reference to the example of the virtual switching of a cell with tag address equal to 13 (a4=0, a3=1, a2=1, a1=0, a0=1) through the 32×32 matrix (FIG. 2), routing will take place as follows. The element in sub-stage 0 distributes the cell on any one of the 4 odd outputs (a0=1) connected to element 12 or 13 in sub-stage 1. The switching element in the latter sub-stage distributes in a similar manner the cell towards one of its even outputs (a1=0) connected to element 22 of sub-stage 2. The latter element interprets the most significant bits of the tag and routes the cell towards its output 3 (a4=0, a3=1, a2=1) to which output OUTL13 is connected.

In case of cell to be routed by distribution with link exclusion, with tag address equal to 13, the cell shall be routed by sub-stages 0 and 1 as described above, while element 22 of sub-stage 2 will route the cell on a different output from its output 3 connected to link 13.

From the constructional point of view, the connection schemes proposed have allowed making a single physical component by mounting multiple integrated circuit base elements on a single substrate (ceramic, laminate . . . ), by exploiting the multichip module technology mentioned above.

Routing Management Logic

In order to allow the architectures described above to be built, the base component that is replicated must be set up to operate either alone or in one of the configurations described. It is therefore necessary to provide a logic that allows its use in the different situations. This logic must be fast and use a few gates, by exploiting what is already embodied in the base component.

By way of example, an efficient and fast logic solution is proposed; said logic solution allows obtaining, depending on the configuration selected at the initialization level (for instance through the micro-processor), all configurations described (with homogeneous and mixed routing) to reach a 32×32 capacity if an 8×8 base element is used. The proposed solution can easily be extended to applications for higher capacities.

Figure 3:
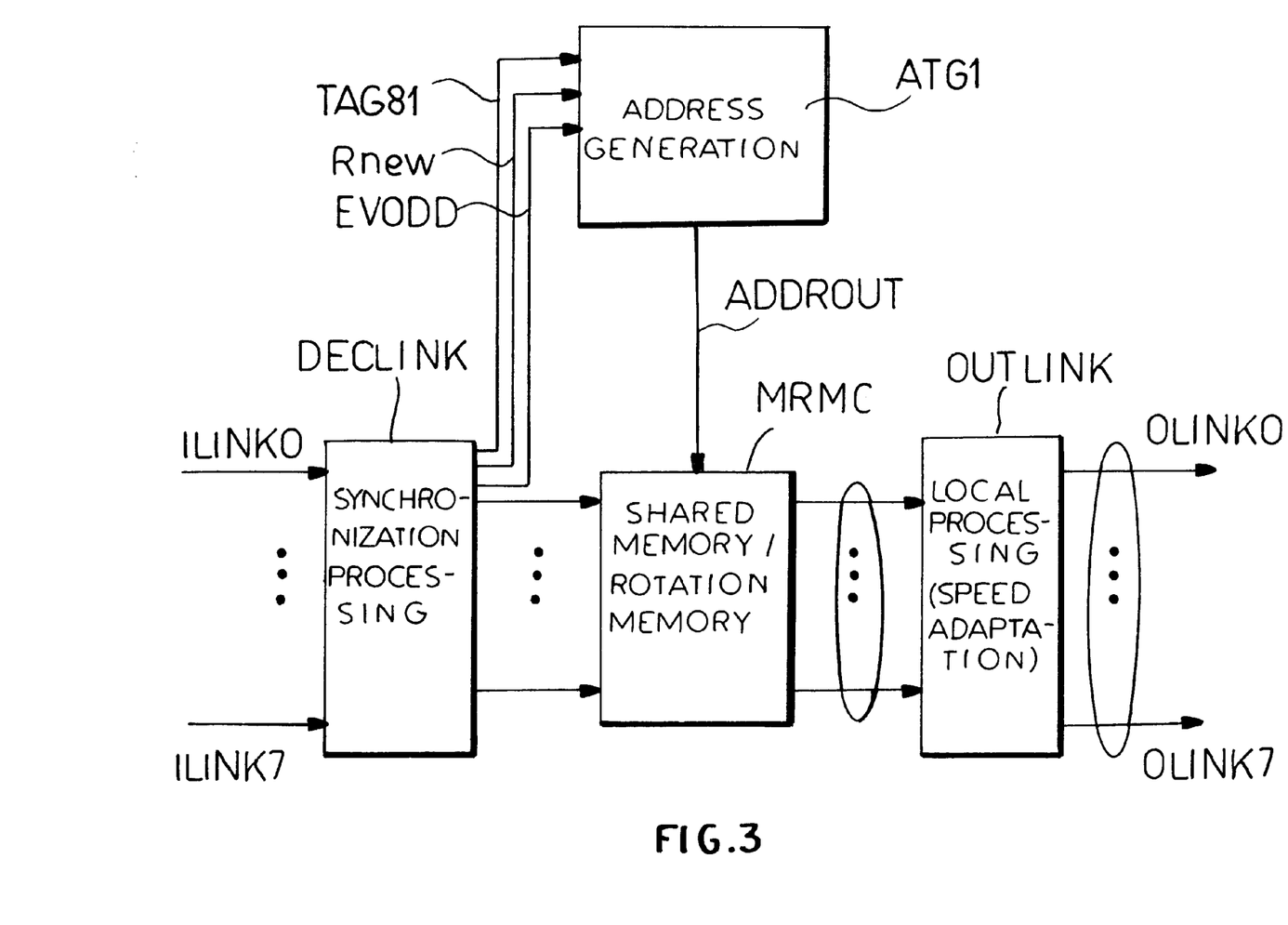
FIG. 3 depicts, as a functional block diagram, the manner in which routing information is managed within a component included in a switching stage according to the invention.

In this regard, the functional diagram in FIG. 3, which can ideally be referred to the scheme reproduced in FIG. 2 of the above mentioned Italian Patent application and in FIG. 3 of the paper by S. Claretto et al., illustrates how the routing information is managed within that base component. In the drawing, the eight input links are denoted ILINK0 . . . ILINK7 and the eight output links are denoted OLINK0 . . . OLINK7.

In particular, the input cells are synchronized in block DECLINK and hence (unless the extraction command for sending the cells towards the microprocessor has been given) are stored in a shared memory present in block MRMC, after appropriate parallelisation in a rotation memory, also contained in block MRMC. Moreover, in DECLINK, a local processing of some cell fields is performed. In particular the routing tag is processed and is then sent to block ATGI on connection TAG81, together with information Rnew (comprising two bits, r2new and r1new related with the routing mode and obtained from bits r2, r1 in FIGS. 1 and 2), and with information EVODD to be described further on.

At the appropriate instant the cell is extracted from block MRMC. Block OUTLINK allows adapting the internal speed of the element, e.g. 90 MHz, to that, programmed through the microprocessor, of the output link OLINK0 . . . OLINK7 on which the cell is sent.

The addresses for the shared memory contained in MRMC are generated in block ATGI by two concurrent state machines: one manages the free location queue and provides the writing address; the other one, on the basis of the processed tags, manages the transmission of the output cells at the appropriate moment and on the correct queue and provides the reading address for the shared memory. These addresses are present on the connection indicated as ADDROUT.

The analysis of the routing tags is also performed in block ATGI, which stores in a memory, for each incoming cell, the identities of the output links on which the cells will be switched, after processing bits Rnew of the involved byte according to appropriate algorithms.

Figure 4:
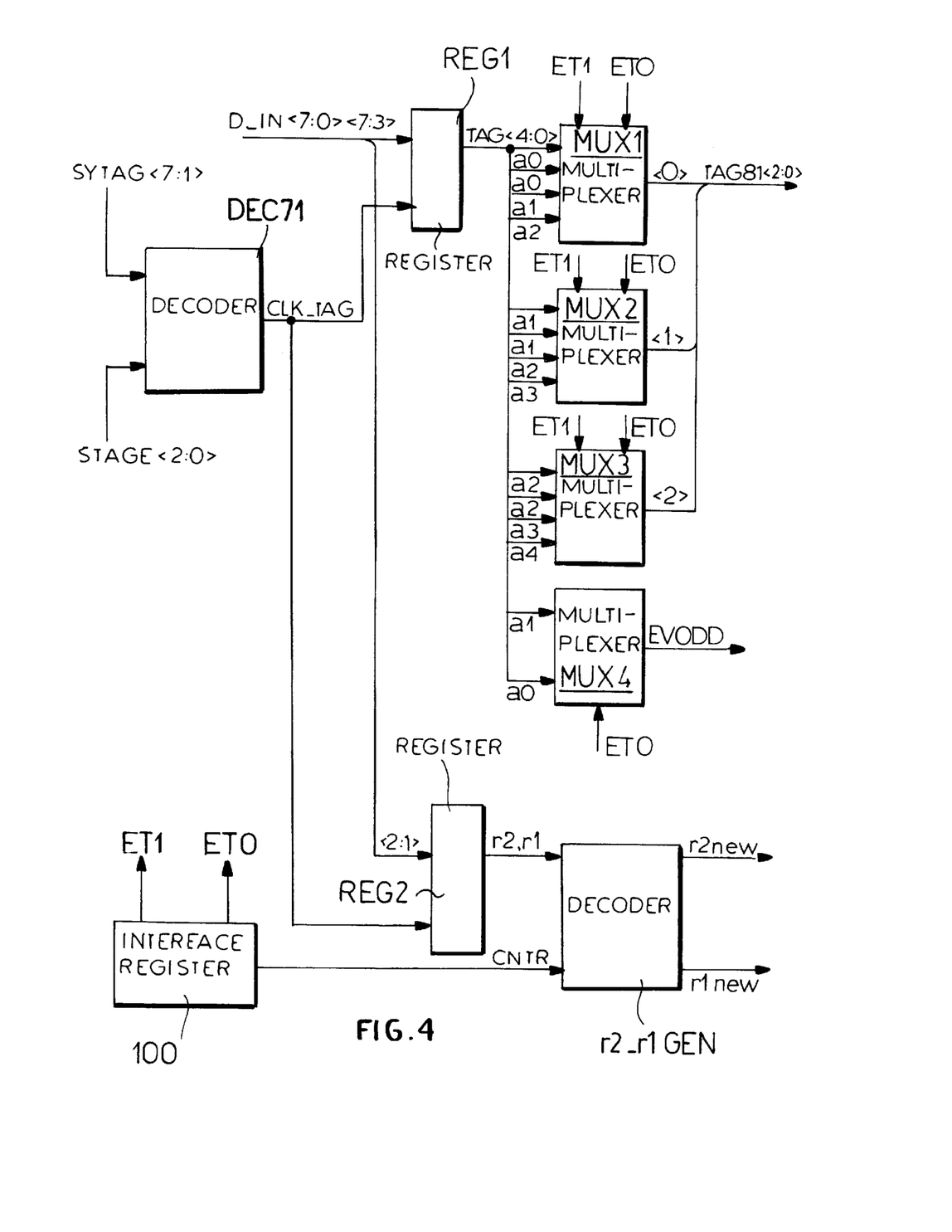
FIGS. 4 and 5 depict, again as a functional block diagram, some constructional and operating details of some elements illustrated in FIG. 3.

In particular, the scheme in FIG. 4 depicts the generation, within block DECLINK, of information TAG81, Rnew and EVODD.

Figure 5:
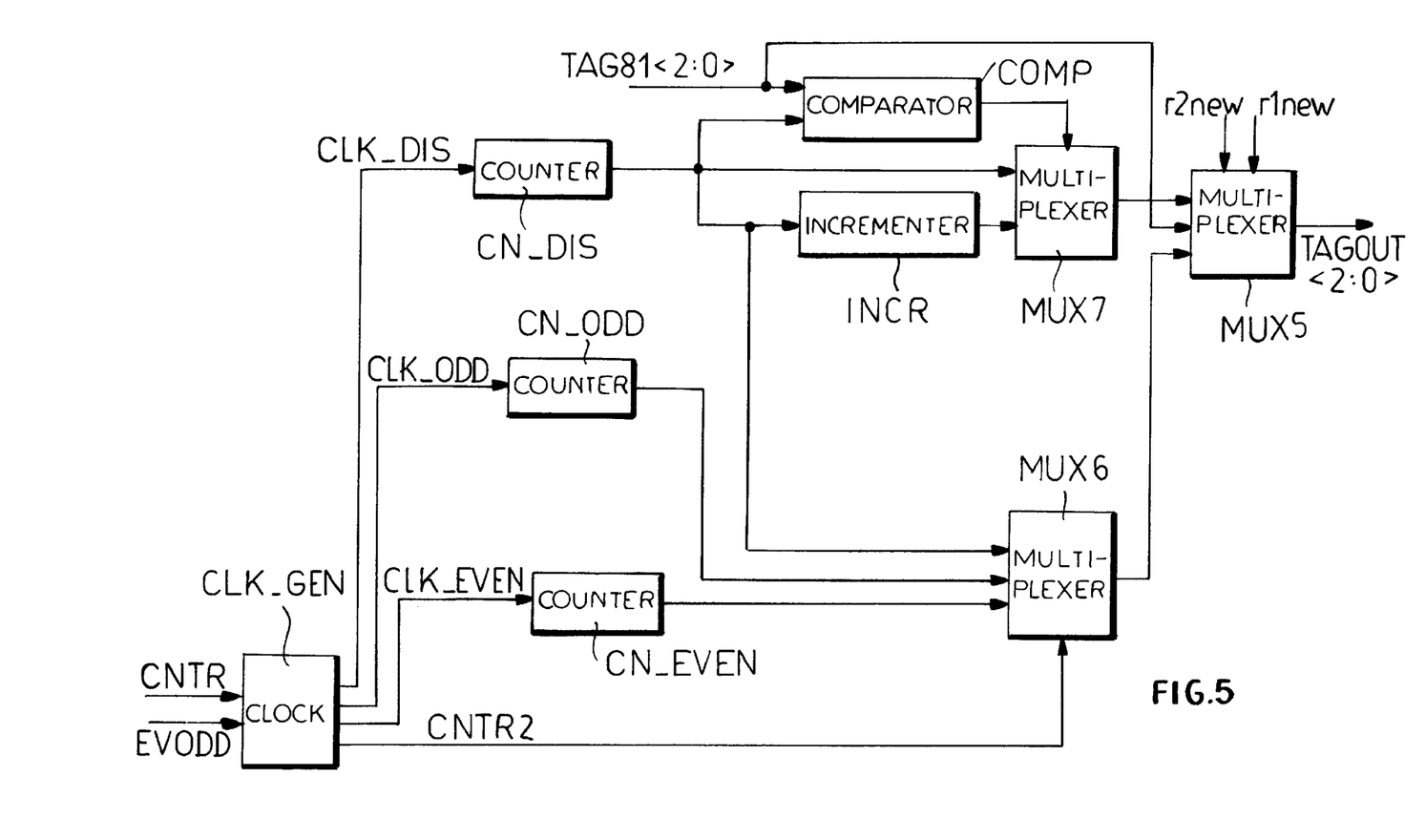

The diagram in FIG. 5, on the other hand, illustrates how block ATGI, starting from information TAG81, Rnew and EVODD, generates an output tag signal, TAGOUT, which drives block MRMC through the ADDROUT connection.

As stated above, the configuration is defined during the initialisation phase by using the state and command registers of the microprocessor interface. Through an appropriate coding, the operating mode (single stage/sub-stage), the type of routing (homogeneous/mixed), the configuration (16×16, 32×32, . . . ), the stage or sub-stage (1, 2, 3, . . . ) are defined. The relevant items of information are sent as control commands to the configuration management logic, contained in interface register denoted by 100 in FIG. 4.

The logic described in connection with FIG. 4 (where notations between the symbols <> indicate, according to current use, the bits involved) masks the tag information (TAG) and the routing bits (r1, r2) so that they are interpreted by the following logic in an appropriate way. It is to be reminded that the masked tag values are used solely at the local level, in the involved element.

In particular, the routing tag selected on the basis of the stage the element belongs to, arrives on connection D_IN. Block DEC71 is a decoding logic which, based on the stage information (STAGE), selects tag synchronism (SYTAG) and generates the data storage clock signal (CLK_TAG). This signal causes storage in two registers (REG1, REG2) of the switching information field (bits 7:3 of D_IN) and the routing mode field (bits 2:1) of the tag, respectively. Block r2_r1GEN is a decoder which, based on the value of signal CNTR which depends on the configuration, on the routing type and on the stage/sub-stage involved, generates signals r2new and r1new which contain the masked routing information. In particular:

in the last sub-stage block r2_r1GEN always forwards the values r2 and r1 received;

in all sub-stages, if field r2-r1 requests cell extraction, block r2_r1GEN maintains unaltered the values of r2, r1 which in any case do not cause a reading from MRMC;

in case of mixed routing, block r2_r1GEN of the sub-stages upstream of the last one always emits values corresponding to random distribution; and in case of homogeneous routing, block r2_r1GEN of the upstream sub-stages maintains unaltered the values of r2, r1.

Multiplexers MUX1, MUX2, MUX3 manage the shift of the tag bits (ai, with i=0, 1, . . . ) to generate the actual tag (TAG81 ). The multiplexers are controlled by a two bit pattern (ET0, ET1), which codes the stage/sub-stage identity and the homogeneous/mixed type of routing and which can be seen as read from interface register 100.

In other words, referring for instance to tags T reproduced in the top part of FIG. 2, multiplexers MUX1, MUX2, MUX3, let pass on output line TAG81 the three bits a2, a1, a0 or a3, a2, a1 or a4, a3, a2, depending on whether, based on the signals present on lines ET1, ET0a, the sub-stage involved is respectively sub-stage 0, sub-stage 1 or sub-stage 2.

Multiplexer MUX4 generates, upon command of ET0, signal EVODD which controls routing of a cell on the even or odd links, by activating appropriate modulo-2 counters, when the involved sub-stage has to operate with even/odd distribution. The masking procedure described allows use of the whole routing management logic provided for in the base component, with the simple addition of modulo-2 counters which allow a separate distribution on even or odd links.

FIG. 5 describes the actual routing logic. The link on which the cell is to be addressed is indicated on connection TAGOUT. Starting for the sake of simplicity from the output side, multiplexer MUX5 selects one of its three inputs in accordance with values r2new, r1new generated by block r2_r1GEN (FIG. 4). In particular, in case of virtual switching, the value of TAG81 , appropriately generated in the previous scheme, is selected; in case of random distribution, the output of multiplexer MUX6 is selected and for distribution with link exclusion the output of multiplexer MUX7 is selected.

Random distribution is managed with three counters:

CN_DIS (modulo-1 counter) cyclically generates eight values corresponding to the eight outputs of the component and is updated by signal CLK_DIS;

CN_EVEN (modulo-2 counter, initialised to 0) cyclically generates all the even outputs of the component and is updated by signal CLK_EVEN; and CN_ODD (modulo-2 counter, initialised to 1) cyclically generates all odd outputs and is updated by signal CLK_ODD.

Multiplexer MUX6 selects the output of one of the counters based on the value of signal CNTR2 which indicates normal (random) distribution, even distribution or odd distribution. Signals CLK_DIS, CLK_EVEN, CLK_ODD, CNTR2 are generated in decoding logic CLK_GEN based on the values of EVODD and CNTR (see FIG. 4).

Distribution with link exclusion is generated by activating counter CN_DIS and incrementing circuit INCR and by comparing, by means of comparator COMP, the value of the output of CN_DIS and the value of the link to be excluded (TAG81 ); if the two values coincide, multiplexer MUX7 lets through the value incremented by block INCR; otherwise, it lets through the value of CN_DIS. Note that "increment" is here used also to indicate a possible negative increment, for instance in the case of a "down counter".

With respect to the routing generation logic needed for the base element, only two counters (CN_EVEN, CN_ODD) and multiplexer MUX6 have been added.

Of course, while the principles of the invention remain unaltered, its constructional details and embodiments can vary broadly with respect to what has been illustrated, without departing from the scope of the present invention.

We claim:

1. A method of expanding the capacity of switching elements having a given number of inputs and outputs, comprising the steps of:

forming an output substage comprising at least a pair of said switching elements;

arranging, upstream of said output substage, at least a first input substage comprising at least a corresponding pair of said switching elements, and connecting the switching elements included in said output substage and in said first input substage in a crossed scheme in which each pair of switching elements in said first input substage is connected to a respective pair of switching elements in said output substage with even and odd outputs of the switching elements in said first input substage being orderly connected to the inputs of the switching elements in said output substage.

2. The method defined in claim 1, further comprising:

forming said output substage with a plurality of pairs of said switching elements, whereby said first input substage comprises a corresponding plurality of pairs of said switching elements, arranging at least a second input substage upstream of said first input substage, and connecting the switching elements included in said first input substage and in said second input substage in a crossed scheme in which each pair of switching elements in said second input substage is connected to a respective pair of switching elements in said first input substage with even and odd outputs of the switching elements of said second input substage being orderly connected to inputs of the switching elements in said first input substage, crossed scheme excluding, for the purposes of the connecting to the outputs of the switching elements in upstream substages, the pairs formed by switching elements for which a pairing relationship exists for the purposes of the connection with the switching elements of the downstream substages.

3. The method defined in claim 2 wherein said elements operate on a single tag containing a pre-set string of bits expressing the switching information for a respective single switching stage.

4. The method defined in claim 3 wherein the switching elements included in a respective one of said substages operate on a respective bit group of said string where at least one bit differs from the bit groups on which the switching elements in the other substages operate.

5. The method defined in claim 3 wherein said switching elements are 8×8 or 16×16 switching elements, and said pre-set string comprises at least four or at least five switching information bits.

6. The method defined in claim 3 wherein the switching elements included in all said substages operate homogeneously according to the same routing mode.

7. The method defined in claim 6 wherein the switching elements of said substages operate homogeneously in a routing mode chosen from virtual routing, random distribution routing, and distribution routing with link exclusion.

8. The method defined in claim 5 wherein said switching elements are arranged to operate in a first and in at least a second routing mode and in that the elements in at least one of said substages operate in said second routing mode, while the elements in the other substage operate in said first routing mode.

9. The method defined in claim 8 wherein said switching elements are arranged to operate in a said first routing mode which is a distribution mode and in at least a second routing mode chosen from virtual routing, random distribution routing and distribution routing with link exclusion.

10. The method defined in claim 8 wherein said at least one of said substages is said output substage.

11. The method defined in claim 4 wherein the elements of said other substage operate on a respective bit group in which one bit determines the choice of even or odd outputs, respectively, to accomplish distribution.

12. The method defined in claim 10 wherein in case of distribution with link exclusion, the exclusion action is performed in said output substage.

13. The method defined in claim 1 wherein said switching elements include a function of cell extraction from an ATM cell stream to be switched.

14. The method defined in claim 5 wherein said switching elements operate on a single tag containing a first and a second bit group expressing the switching information and, respectively, one among a plurality of routing modes that can be carried out in a respective single switching stage, and in that the method comprises, at the level of each of said substages, the operations of:

processing said second bit group to identify a respective routing mode; and processing said first bit group in a different manner according to said respective routing mode.

15. The method defined in claim 10 wherein the elements of said other substage process said second bit group by identifying the respective routing mode as distribution routing.

16. A switching stage formed from a plurality of switching elements each having a given number of inputs and outputs comprising:

an output substage comprising at least one pair of said switching elements, and at least a first input substage placed upstream of said output substage and comprising at least one corresponding pair of said switching elements, wherein the switching elements included in said output substage and in said first input substage are connected to each other in a cross scheme so that each pair of switching elements in said first input substage is connected to a respective pair of switching elements in said output substage, the even and odd outputs of the switching elements of said first input substage being orderly connected to the inputs of the switching elements of said output substage.

17. The switching stage defined in claim 16 wherein:

said output substage comprises a plurality of pairs of said switching elements, whereby said first input substage comprises a corresponding plurality of said switching elements, and at least a second input substage provided upstream of said first input substage, the switching elements included in said first input substage and in said second input substage being connected to each other in a crossed scheme so that each pair of switching elements in said second input substage is connected to a respective pair of switching elements in said first input substage, the even and odd outputs of the switching elements in said second input substage being orderly connected to the inputs of the switching elements of said first input substage, the aforesaid cross scheme excluding from the connection to the outputs of the switching elements in upstream substages, the pairs formed by switching elements for which there is a pairing relationship in the connection with the switching elements of downstream substages in said stage.

18. The switching stage defined in claim 17 wherein all switching elements in the stage operate on a single tag containing a pre-set string of bits expressing the switching information for the stage.

19. The switching stage defined in claim 18 wherein the switching elements comprised in a respective one of said substages operate on a respective bit group of said string which group differs by at least one bit from the bit groups on which the switching elements of the other substages operate.

20. The switching stage defined in claim 18 wherein said switching elements are 8×8 or 16×16 switching elements, and said pre-set string comprises at least four or at least five switching information bits, respectively.

21. The switching stage defined in claim 16 wherein said given number of inputs and of outputs is identical for all substages.

22. The switching stage defined in claim 16 which comprises at least two substages in which the switching elements are configured to operate in a first and at least in a second routing mode.

23. The switching stage defined in claim 22 wherein said first routing mode is a distribution routing, and said at least a second routing mode is chosen from the group comprising virtual routing, distribution routing and distribution routing with link exclusion.

24. The switching stage defined in claim 22 wherein said output substage operates in said at least a second routing mode, while the elements of the other substages operate in said first routing mode.

25. The switching stage defined in claim 18 wherein said switching elements comprise a function of cell extraction from an ATM cell stream to be switched.

26. A method of expanding the capacity of switching elements having a given number of inputs and outputs, comprising the steps of:

forming an output substage comprising at least a pair of said switching elements;

arranging, upstream of said output substage, at least a first input substage comprising at least a corresponding pair of said switching elements;

connecting the switching elements included in said output substage and in said first input substage in a crossed scheme in which each pair of switching elements in said first input substage is connected to a respective pair of switching elements in said output substage, the even and odd outputs of the switching elements in said first input substage being orderly connected to the inputs of the switching elements in said output substage;

said switching elements operating on a single tag containing a first and a second bit group expressing the switching information and, respectively, one among a plurality of routing modes that can be carried out in a respective single switching stage, and in that the method comprises:

processing said second bit group to identify a respective routing mode; and processing said first bit groun in a different manner according to said respective routing mode, and at the level of each of said substages, the operations of:

(a) when said second bit group identifies a virtual routing for the substage involved, processing said first bit group by identifying, within said first bit group, a respective sub-set of bits which identifies the virtual routing function accomplished by the respective substage;

(b) when said second bit group identifies a distribution routing for the substage involved, processing said first bit group by identifying an even or odd distribution function, and generating a routing function by means of an even or odd count depending on the even or odd nature of said distribution function; and (c) when said second bit group identifies a distribution routing with exclusion for the substage involved, processing said first bit group, according to step (a) above, by using said respective subset of bits as exclusion value.

27. The method defined in claim 26 wherein said step (c) comprises the operation of:

generating a respective count value comparing said respective count value with said respective subset of bits, and in case said comparison indicates identity, incrementing said count value and using said incremented count value to identify the routing function accomplished by the respective substage.

28. A switching stage formed from a plurality of switching elements each having a given number of inputs and outputs comprising:

an output substage comprising at least one pair of said switching elements, and at least a first input substage placed upstream of said output substage and comprising at least one corresponding pair of said switching elements, wherein the switching elements included in said output substage and in said first input substage are connected to each other in a cross scheme so that each pair of switching elements in said first input substage is connected to a respective pair of switching elements in said output substage, the even and odd outputs of the switching elements of said first input substage being orderly connected to the inputs of the switching elements of said output substage and wherein:

said output substage comprises a plurality of pairs of said switching elements, whereby said at least a first input substage comprises a corresponding plurality of said switching elements, and at least a second input substage provided upstream of said first input substage, the switching elements included in said first input substage and in said second input substage being connected to each other in a crossed scheme so that each pair of switching elements in said second input substage is connected to a respective pair of switching elements in said first input substage, the even and odd outputs of the switching elements in said second input substage being orderly connected to the inputs of the switching elements of said first input substage, the aforesaid cross scheme excluding from the connection to the outputs of the switching elements in upstream substages, the pairs formed by switching elements for which there is a pairing relationship in the connection with the switching elements of downstream substages in said stage, said switching elements operating on a single tag containing a first and a second bit group expressing, respectively, the switching information and one among a plurality of routing modes that can be accomplished in a respective single switching stage, and in that said elements comprise processing means responsive to said second bit group to process said first bit group in a different manner depending on said second bit group.

29. The switching stage defined in claim 28 wherein said processing means comprise first selection means which are fed with said first bit group to identify, within said first bit group, a respective sub-set of bits identifying the routing function carried out by the respective substage.

30. The switching stage defined in claim 28, further comprising an even/odd discrimination element responsive to a respective bit of said first group, as well as first and second counting means, respectively supplying an odd and an even count, as well as second selection means controlled by said even/odd discrimination element to select, as distribution routing function, the output of said first or said second counting means, respectively, depending on the value of said respective bit of said first group.

31. The switching stage defined in claim 30 wherein comparison means are associated with said first selection means which comparison means are activated, when said second bit group identifies for the respective substage a distribution routing with link exclusion, to exclude the use of said respective sub-set of bits as a routing function of the respective substage.

32. The switching stage defined in claim 31 which comprises an additional counter whose output is compared with said respective sub-set of bits in said comparison means; said additional counter being associated with incrementing means to increment the count value of said additional counter, as well as with third selection means to select either said respective sub-set of bits or said incremented count value as routing function of the respective substage, in case of nonequality and, respectively, of equality between the output of said additional counter and said respective sub-set of bits.

33. The switching stage defined in claim 32 which comprises fourth selection means responsive to said second bit group and arranged to select, as a result of processing said first bit group:

the output of said first selection means;

the output of said second selection means; and the output of said third selection means.

34. The switching stage defined in claim 28 wherein, at least in said input substages, the switching elements comprise a processing unit responsive to said second bit group, said unit processing said second bit group to identify the respective routing mode as random distribution routing.

* * * * *